US012652234B2

(12) United States Patent
Zhang et al.

(10) Patent No.: US 12,652,234 B2
(45) Date of Patent: Jun. 9, 2026

(54) SERVICE DATA PROCESSING METHOD AND APPARATUS, AND DEVICE

(71) Applicant: VIVO MOBILE COMMUNICATION CO., LTD., Guangdong (CN)

(72) Inventors: Yanxia Zhang, Guangdong (CN); Zhenhua Xie, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 306 days.

(21) Appl. No.: 18/479,033

(22) Filed: Sep. 30, 2023

(65) Prior Publication Data

US 2024/0031279 A1     Jan. 25, 2024

Related U.S. Application Data

(63) Continuation of application No. PCT/CN2022/082468, filed on Mar. 23, 2022.

(30) Foreign Application Priority Data

Mar. 30, 2021     (CN) .......................... 202110341235.7

(51) Int. Cl.
| | |
|---|---|
| *H04L 45/24* | (2022.01) |
| *H04L 45/16* | (2022.01) |
| *H04W 28/02* | (2009.01) |

(52) U.S. Cl.
CPC .............. *H04L 45/24* (2013.01); *H04L 45/16* (2013.01); *H04W 28/0215* (2013.01)

(58) Field of Classification Search
CPC ..... H04L 45/24; H04L 45/16; H04L 12/1863; H04L 12/189; H04W 28/0215;
(Continued)

(56) References Cited

U.S. PATENT DOCUMENTS

| | | |
|---|---|---|
| 2012/0163274 A1 | 6/2012 | Yun et al. |
| 2013/0301509 A1 | 11/2013 | Purnadi |

(Continued)

FOREIGN PATENT DOCUMENTS

| | | |
|---|---|---|
| CN | 104303550 A | 1/2015 |
| CN | 104871570 A | 8/2015 |

(Continued)

OTHER PUBLICATIONS

First Office Action for Chinese Application No. 202110341235.7, dated Aug. 7, 2023, 8 Pages.
(Continued)

*Primary Examiner* — Donald L Mills
(74) *Attorney, Agent, or Firm* — BROOKS KUSHMAN P.C.

(57)     ABSTRACT

A service data processing method and apparatus, and a device, and pertains to the field of communications technologies. The service data processing method in embodiments of the application includes: forwarding, by a source node based on an MBS capability of a target node, service data of a target multicast service to the target node through a data forwarding tunnel of a dedicated bearer of a terminal; where the terminal receives the target multicast service from the source node through a source multicast bearer.

20 Claims, 4 Drawing Sheets

301

A terminal reconfigures a dedicated bearer based on a reconfiguration message received from a source node

302

The terminal receives service data of a target multicast service from a target node through the dedicated bearer

(58) Field of Classification Search
CPC ............... H04W 4/06; H04W 36/0007; H04W
36/0064; H04W 36/023; H04W 76/40
See application file for complete search history.

(56) References Cited

U.S. PATENT DOCUMENTS

| 2014/0286222 | A1 | 9/2014 | Yu et al. | |
|---|---|---|---|---|
| 2015/0109987 | A1 | 4/2015 | Wang et al. | |
| 2015/0146617 | A1 | 5/2015 | Park et al. | |
| 2016/0316398 | A1 | 10/2016 | Han et al. | |
| 2021/0051541 | A1 | 2/2021 | Liu et al. | |
| 2021/0068003 | A1 | 3/2021 | Kadiri et al. | |
| 2022/0124583 | A1* | 4/2022 | Wang | H04W 76/40 |
| 2022/0338088 | A1 | 10/2022 | Zong et al. | |
| 2022/0338291 | A1 | 10/2022 | Hong | |
| 2023/0050709 | A1 | 2/2023 | Lei | |
| 2023/0199569 | A1 | 6/2023 | Cao et al. | |
| 2023/0199805 | A1 | 6/2023 | Liu | |
| 2023/0284099 | A1* | 9/2023 | Xu | H04W 76/12 |
| | | | | 370/331 |
| 2023/0284101 | A1* | 9/2023 | Dai | H04L 1/1893 |
| | | | | 370/331 |
| 2023/0292227 | A1* | 9/2023 | Wang | H04W 36/0007 |

FOREIGN PATENT DOCUMENTS

| CN | 107770727 | A | 3/2018 |
|---|---|---|---|
| CN | 111866975 | A | 10/2020 |
| CN | 112075093 | A | 12/2020 |
| CN | 112243199 | A | 1/2021 |
| CN | 113079548 | A | 7/2021 |
| CN | 114079878 | A | 2/2022 |
| EP | 2385743 | A1 | 11/2011 |
| EP | 2493239 | A1 | 8/2012 |
| EP | 3051846 | A1 | 8/2016 |
| WO | 2011022960 | A1 | 3/2011 |
| WO | 2015100733 | A1 | 7/2015 |
| WO | 2018030776 | A1 | 2/2018 |
| WO | 2021054674 | A1 | 3/2021 |
| WO | 2022033473 | A1 | 2/2022 |

OTHER PUBLICATIONS

Huawei, et. al. "KI#7, New Solution: Inter-RAN node MBS Session Handover" 3GPP TSG SA2 Meeting #139E, Elbonia, Jun. 2020, S2-2003966, 8 Pages.

International Search Report and Written Opinion for Application No. PCT /CN2022/082468, dated Jun. 15, 2022, 11 Pages.

Huawei, et. al. "KI1: Update of Sol. 3: resolving open issue(s)" 3GPP TSG-WG SA2 Meeting #140E e-meeting, Elbonia, Aug. 2020, S2-2005411, 14 Pages.

Huawei, et. al. "KI1: Update of Sol. 3: resolving open issue(s)" 3GPP TSG-WG SA2 Meeting #140E e-meeting, Elbonia, Aug. 2020, S2-2006299, 15 Pages.

Extended European Search Report for Application No. 22778688.6, dated Aug. 2, 2024, 14 Pages.

Samsung "Mobility with Service Continuity" 3GPP TSG-RAN WG2 Meeting #113-e, Online, Jan. 2021, R2-2100450, 4 Pages.

Lenovo, Motorola Mobility "Connected Mode Mobility with Service Continuity" 3GPP TSG-RAN WG2 Meeting #113e, Online, Jan. 2021, R2-2101140, 3 pages.

First Office Action for Japanese Application No. 2023-557245, dated Aug. 26, 2024, 6 Pages.

CATT "TP on TS 38.300 on MBS service continuity" 3GPP TSG-RAN WG3 #111-e, E-meeting, Jan. 2021, R3-210315, 10 Pages.

Huawei "Summary of Offline Discussion on MBS_Mobility_Non-supporting" 3GPP TSG-RAN WG3 Meeting #111-e, Online, Jan. 2021, R3-20xxxx, R3-211032, 16 Pages.

* cited by examiner

12

Network-side
device 11                    11

Terminal

Terminal

201

A source node forwards, based on an MBS capability of a
target node, service data of a target multicast service to
the target node through a data forwarding tunnel of a
dedicated bearer of a terminal

SERVICE DATA PROCESSING METHOD AND APPARATUS, AND DEVICE

CROSS-REFERENCE TO RELATED APPLICATIONS

This application is a continuation of PCT International Application No. PCT/CN2022/082468 filed on Mar. 23, 2022, which claims priority to Chinese Patent Application No. 202110341235.7, filed on Mar. 30, 2021, which are incorporated herein by reference in their entireties.

TECHNICAL FIELD

This application pertains to the field of communications technologies, and specifically relates to a service data processing method and apparatus, and a device.

BACKGROUND

During a moving process of a terminal, the terminal may move from a node supporting multicast broadcast service (MBS) to a node not supporting MBS. In this scenario, MBS-related multicast transmission tunnel resources cannot be switched to a node not supporting MBS in an existing mechanism.

SUMMARY

According to a first aspect, a service data processing method is provided, including:

forwarding, by a source node based on an MBS capability of a target node, service data of a target multicast service to the target node through a data forwarding tunnel of a dedicated bearer of a terminal; where the terminal receives the target multicast service from the source node through a source multicast bearer.

According to a second aspect, a service data processing method is provided, including:

reconfiguring, by a terminal, a dedicated bearer based on a reconfiguration message received from a source node; and receiving, by the terminal, service data of a target multicast service from a target node through the dedicated bearer; where the terminal receives the target multicast service from the source node through a source multicast bearer.

According to a third aspect, a service data processing apparatus is provided, including:

a first forwarding module, configured to: forward, for a source node based on an MBS capability of a target node, service data of a target multicast service to the target node through a data forwarding tunnel of a dedicated bearer of a terminal; where the terminal receives the target multicast service from the source node through a source multicast bearer.

According to a fourth aspect, a service data processing apparatus is provided, including:

a second configuration module, configured to reconfigure a dedicated bearer based on a reconfiguration message received from a source node; and a first receiving module, configured to receive, for the terminal, service data of a target multicast service from a target node through the dedicated bearer; where the terminal receives the target multicast service from the source node through a source multicast bearer.

According to a fifth aspect, a source node is provided, where the source node includes a processor, a memory, and a program or instructions stored in the memory and capable of running on the processor, and when the program or the instructions are executed by the processor, the steps of the method according to the first aspect are implemented.

According to a sixth aspect, a source node is further provided, including a processor and a communication interface, where the communication interface is configured to forward, for the source node based on an MBS capability of a target node, service data of a target multicast service to the target node through a data forwarding tunnel of a dedicated bearer of a terminal; where the terminal receives the target multicast service from the source node through a source multicast bearer.

According to a seventh aspect, a terminal is provided, where the terminal includes a processor, a memory, and a program or instructions stored in the memory and capable of running on the processor, and when the program or the instructions are executed by the processor, the steps of the method according to the second aspect are implemented.

According to an eighth aspect, a terminal is further provided, including a processor and a communication interface, where the processor is configured to reconfigure, for the terminal, a dedicated bearer based on a reconfiguration message received from a source node; and the communication interface is configured to receive, for the terminal, service data of a target multicast service from a target node through the dedicated bearer; where the terminal receives the target multicast service from the source node through a source multicast bearer.

According to a ninth aspect, a readable storage medium is provided, where a program or instructions are stored in the readable storage medium, and when the program or the instructions are executed by a processor, the steps of the method according to the first aspect are implemented, or the steps of the method according to the second aspect are implemented.

According to a tenth aspect, a chip is provided, where the chip includes a processor and a communication interface, the communication interface is coupled to the processor, and the processor is configured to run a program or instructions to implement the steps of the method according to the first aspect or implement the steps of the method according to the second aspect.

According to an eleventh aspect, a computer program/program product is provided, where the computer program/program product is stored in a non-volatile storage medium, and the program/program product is executed by at least one processor to implement the steps of the method according to the first aspect or the steps of the method according to the second aspect.

According to a twelfth aspect, a communication device is provided and configured to perform the steps of the method described in the first aspect or the second aspect.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

It should be noted that techniques described in the embodiments of this application are not limited to a long term evolution (LTE) or LTE-advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communication system.

Figures 1, 2:
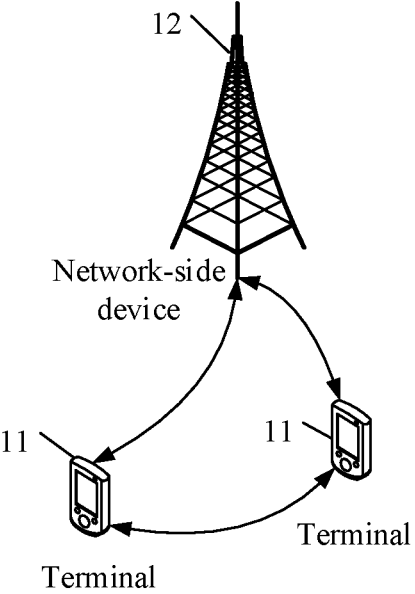
FIG. 1 is a schematic architectural diagram of a wireless communications system according to an embodiment of this application.
FIG. 2 is a first schematic flowchart of a service data processing method according to an embodiment of this application.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smart watch, a wrist band, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless fidelity (WiFi) node, a transmission and reception point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

To better understand the solutions in the embodiments of this application, the following content is first described.

1. NR MBS Mechanism

At present, to support MBS, a base station and a core network device can establish a shared tunnel (which can be understood as a data tunnel being shared by multiple terminals) for transmitting MBS service data. The radio access network (RAN) side can provide a multicast service through a multicast bearer, specifically providing MBS services in two modes: point-to-point (PTP) and point-to-multipoint (PTM). PTM is a point-to-multipoint transmission mode, which can be understood as that the RAN uses the same radio resource to transmit multicast service data to multiple terminals, and PTP is a point-to-point transmission mode, which can be understood as that the RAN uses a terminal-dedicated radio resource to transmit multicast service data to a specific terminal.

In addition to the foregoing manner in which the RAN receives multicast service data from the core network through a shared tunnel, the RAN can also receive multicast service data from the core network through a terminal-dedicated tunnel (which is the unicast tunnel in the existing mechanism), and the RAN side sends multicast service data to the terminal through a terminal-dedicated data radio bearer (DRB). It can be understood that in this method, data tunnels between the terminal and the RAN and between the RAN and the core network are all terminal-dedicated unicast data transmission tunnels.

The following describes in detail a service data processing method provided in the embodiments of this application by using some embodiments and application scenarios thereof with reference to the accompanying drawings.

Referring to FIG. 2, an embodiment of this application provides a service data processing method, including the following step.

Step 201: A source node forwards, based on an MBS capability of a target node, service data of a target multicast service to the target node through a data forwarding tunnel of a dedicated bearer of a terminal.

It should be noted that the MBS capability of the target node refers to whether the target node has a capability of providing multicast services through multicast communication. For example, when the target node supports the MBS capability (which can also be understood as having the MBS capability), the target node may establish a multicast tunnel with a core network, receive data of a multicast service from the core network through the multicast tunnel, and then provide service data of the multicast service to the terminal through a multicast bearer (MRB). Conversely, when the target node does not support the MBS capability (which can also be understood as not having the MBS capability), the target node cannot establish a multicast tunnel with the core network, but can merely establish a dedicated unicast tunnel of the terminal, receives data of a multicast service from the core network through the unicast tunnel, and then provides service data of the multicast service to the terminal through a terminal-dedicated bearer (which can be understood as a unicast bearer, that is, a data radio bearer DRB). Such data transmission mode is the same as a unicast service data transmission mode; therefore, it can be further understood that the base station not supporting the MBS capability may be a legacy base station.

In this embodiment of this application, the source node supports the MBS capability, and the terminal receives the target multicast service from the source node through the source multicast bearer. The MBS capability of the target node may specifically be supporting the MBS capability or not supporting the MBS capability. The source node determines, based on the MBS capability of the target node, to send the service data of the target multicast service through the dedicated bearer of the terminal. For example, on the source node, the terminal receives, through a multicast radio bearer, that is, a source multicast bearer MRB1, a temporary mobile group identity (TMGI) for the target multicast service, that is, service data of a multicast service with an identifier of TMGI1. The source node determines to hand over the terminal to the target node. If the target node does not support MBS, MRB1 cannot be switched to the target node. In this case, the source node determines to forward data corresponding to MRB1 to the terminal through the dedicated bearer of the terminal, for example, DRB1, so as to ensure that the terminal being handed over to the target node can continue to receive the service data of the multicast service TMGI1 from the target node through the dedicated bearer of the terminal DRB.

In this embodiment of this application, the source node sends, based on the MBS capability of the target node, the service data of the target multicast service to the terminal through the dedicated bearer, so as to resolve the problem of an excessively long interruption time for multicast service data caused by movement of a terminal from a node supporting MBS to a node not supporting MBS.

In some implementations, before the source node forwards the service data of the target multicast service to the target node through the data forwarding tunnel of the dedicated bearer of the terminal based on the MBS capability of the target node, the method further includes: the source node obtains the MBS capability of the target node based on one or more of the following information, that is, the source node may learn a status of supporting the MBS capability by the target node in the following manners, so as to learn whether the target node is a legacy node (not supporting the MBS capability).

Manner 1: Multicast Configuration Information in a Handover Acknowledgment Message Specifically, that the source node obtains the MBS capability of the target node based on the multicast configuration information in the handover acknowledgment message includes:

(1) the source node sends a handover request message to the target node, where the handover request message carries multicast configuration information of the terminal being on the source node;

(2) the source node receives a handover acknowledgment message from the target node; and (3) the source node performs at least one of the following:

(3.1) if the handover acknowledgment message carries no multicast configuration information of the terminal on the target node, determining that the target node does not support the MBS capability; and (3.2) if the handover acknowledgment message carries multicast configuration information of the terminal on the target node, determining that the target node supports the MBS capability.

In this embodiment of the application, the source node carries the multicast configuration information (for example, multicast bearer MRB configuration information) of the terminal being on the source node in the handover request, and then receives the handover acknowledgment message from the target node. In a case that the handover acknowledgment message of the target node carries no multicast configuration information (for example, multicast bearer MRB configuration information) of the terminal on the target node, the source node determines that the target node is a legacy node. It can be understood that in this manner, the source node learns the target node being a legacy node only during a handover negotiation process.

Manner 2: Capability Exchange Information Between the Source Node and the Target Node, Which is, for Example, Exchanged Over an Xn Interface Between the Source Node and the Target Node Specifically, that the source node obtains the MBS capability of the target node based on the capability exchange information between the source node and the target node includes:

(1) sending, by the source node, a capability request message to the target node;

(2) receiving, by the source node, a capability request response message from the target node, where the capability request response message carries information about capabilities supported by the target node and/or information about capabilities not supported by the target node; and (3) based on the information about capabilities supported by the target node and/or the information about capabilities not supported by the target node, determining that the target node does not support the MBS capability or supports the MBS capability.

In this embodiment of the application, the source node sends the capability request message to the target node, and the target node carries the information about capabilities supported and/or not supported by the target node in the capability request response message. The information about capabilities supported by the target node refers to all capabilities supported by the target node, and if no MBS capability is present in the capability information, it can be determined that the target node does not support the MBS capability. Similarly, the information about capabilities not supported by the target node refers to all capabilities not supported by the target node, and if the MBS capability is included in the capability information, it can be determined that the target node does not support the MBS capability.

Specifically, that the source node obtains the MBS capability of the target node based on the capability exchange information between the source node and the target node includes:

(1) sending, by the source node, a capability indication message to the target node, where the capability indication message carries information about capabilities supported by the source node and/or information about capabilities not supported by the source node;

(2) receiving, by the source node, a capability indication acknowledgment message from the target node, where the capability indication acknowledgment message carries information about capabilities supported by the target node and/or information about capabilities not supported by the target node; and (3) based on the information about capabilities supported by the target node and/or the information about capabilities not supported by the target node, determining that the target node does not support the MBS capability or supports the MBS capability.

In this embodiment of the application, the source node sends the capability indication message to the target node, and the message carries the information about capabilities supported and/or not supported by the source node. For example, the source node has the information about capabilities supported and/or not supported by the source node carried in an XN SETUP REQUEST message. In this way, the target node may have the information about capabilities supported and/or not supported by the target node carried in the capability indication acknowledgment message, and correspondingly the target node may have the information about capabilities supported and/or not supported by the target node carried in an XN SETUP RESPONSE message.

It should be noted that, through the Xn interaction process similar to the above, the source node may learn, before handover negotiation, whether the target node is a node not supporting MBS. In addition, it should be noted that if the source node determines, before handover negotiation, that the target node is a legacy node, the handover request does not carry multicast-related configuration information (for example, multicast bearer-related configuration information).

In some implementations, the source node may configure a dedicated bearer for the terminal in any one of the following configuration manners:

Configuration Manner 1:

The source node configures a dedicated bearer before determining to hand over the terminal to the target node.

In this embodiment of this application, the dedicated bearer of the terminal is a dedicated bearer that is used for transmitting service data of the target multicast service and that is configured before the source node determines to hand over the terminal to the target node. For example, on the source node, the terminal receives multicast service data of a multicast service TMGI1 through a multicast bearer MRB1. In addition, the source node also configures a dedicated bearer DRB1 for the terminal, and the dedicated bearer DRB1 can be used to transmit the multicast service data of the multicast service TMGI1. Because the terminal being on the source node can receive the multicast service data through the multicast bearer MRB1, the source node does not need to use the dedicated bearer DRB1 for data transmission. This configuration manner is applicable to a scenario where the source node learns, before or after the handover negotiation, that the target node is a legacy base station.

Configuration Manner 2:

The source node configures a dedicated bearer after determining to hand over the terminal to the target node.

In this embodiment of this application, the dedicated bearer of the terminal is a dedicated bearer that is used for transmitting service data of the target multicast service and that is configured for the terminal after the source node determines to hand over the terminal to the target node, that is, being configured during the handover preparation process. For example, on the source node, the terminal receives the multicast service data of the multicast service TMGI1 through the multicast bearer MRB1, and the source node determines to hand over the terminal to the target node. Because the source node learns in advance through Xn interaction that the target node is a legacy base station, the source node temporarily establishes one dedicated bearer for the terminal, and continues to send the multicast service data of the multicast service TMGI1 to the terminal through the dedicated bearer. The advantage of this dedicated bearer configuration manner is configuring the dedicated bearer as needed, that is, the dedicated bearer is configured only when the terminal is to be handed over to a target node not supporting MBS. If no handover occurs or handover to a target node supporting MBS is performed, the dedicated bearer does not need to be configured, thereby reducing occupancy of radio bearer resources and reducing radio bearer identification resources.

In some implementations, the dedicated bearer is used to carry service data of the target multicast service. It can be understood that the dedicated bearer may be used to carry all service data of the target multicast service or the dedicated bearer may be used to carry specific data flows of the target multicast service. As an example, the multicast service TMGI includes service data flows flow1 and flow2. The network side may configure a dedicated bearer DRB1 for carrying all data of service data flows flow1 and flow2, or the network side may configure a dedicated bearer DRB1 for carrying all data of the service data flow flow1 and a dedicated bearer DRB2 for carrying all data of flow2.

In addition, it should be noted that if a mapping relationship between the dedicated bearer and the target multicast service is not configured on the network side (the mapping relationship may indicate that the dedicated bearer DRB1 is dedicated to carrying the service data of the multicast service TMGI1, or the dedicated bearer DRB1 is dedicated to carrying a specific data flow of the multicast service (where different data flows can be distinguished by data flow identifier QFI)), the network side may send service data of multiple multicast services to the target node through the data forwarding tunnel of the dedicated bearer. It can be understood that this case is equivalent to that the service data of the multiple multicast services shares a data forwarding tunnel of one dedicated bearer DRB. In addition, the method of this patent can also be applied to a more complex scenario, that is, a scenario where service data of one or more multicast services and service data of a unicast service can share a data forwarding tunnel of one dedicated bearer DRB.

In some implementations, the method further includes:

sending, by the source node, first indication information to the terminal, where the first indication information is used to indicate that the dedicated bearer is used to carry service data of the target multicast service.

After receiving the first indication information, the terminal may determine that both the dedicated bearer and the source multicast bearer are for carrying data of the target multicast service. In some scenarios, this can help implement on-demand delivery for the terminal. For example, data sent through the source multicast bearer is later than data sent by the target node through the dedicated bearer. In theory, data of the terminal sent by the target node needs to be delivered to the upper layer later than data received through the source multicast bearer. Therefore, after the terminal learns that the dedicated bearer and the source multicast bearer are associated with a same target multicast service, the terminal can deliver the data received through the dedicated bearer to the upper layer of the terminal after receiving all the data of the source multicast bearer or waiting for a period of time. In some other scenarios, this can help implement repeated detection for the terminal. For example, to ensure service reliability, the network side may send the same data packet through both the source multicast bearer and the dedicated bearer of the target node. After the terminal learns that the dedicated bearer and the source multicast bearer are associated with the same target multicast service, the terminal may learn, based on data packet numbers, which data is sent repeatedly, further avoiding delivering repeated data packets to the upper layer of the terminal.

In some implementations, the source node may forward the service data of the target multicast service to the target node in any one of the following forwarding manners:

Forwarding Manner 1:

The source node determines the target number based on a numbering status of the dedicated bearer, and indicates the target number to the target node by sending the target number. The target number is used for indicating, to the target node, a number assigned to a target data packet, and the target data packet is a next not-yet-numbered data packet to be sent through the dedicated bearer.

Specifically, that the source node determines the target number based on the numbering status of the dedicated bearer includes: determining, by the source node, a next to-be-assigned number of the dedicated bearer as the target number;

In this embodiment of this application, the source node determines, based on the numbering status of the dedicated bearer of the terminal, a number to be assigned to the next data packet that has not been assigned a number and that is to be sent through the dedicated bearer, and then indicates the number to the target node. For example, on the source node, the terminal receives the service data of the target multicast service TMGI1 through the MRB1, and the network side configures a dedicated bearer DRB1 for the terminal. Because the network side sends the service data of the target multicast service to the terminal through the multicast bearer MRB, but does not send the service data of the target multicast service to the terminal through the dedicated bearer DRB1, the next data packet to be sent through the dedicated bearer DRB1 should be assigned a number with an initial value being 0, that is, a number being PDCP COUNT=0. The terminal indicates, to the target node, the number 0 that is determined based on the numbering status of the dedicated bearer DRB1.

Forwarding Manner 2:

The source node determines the target number based on a numbering status of the service data of the target multicast service on the source multicast bearer, and indicates the target number to the target node. The target number is used for indicating, to the target node, a number assigned to a target data packet, and the target data packet is a next not-yet-numbered data packet to be sent through the dedicated bearer.

Specifically, that the source node determines the target number based on the numbering status of the service data of the target multicast service on the source multicast bearer includes: determining, by the source node, a next to-be-assigned number of the source multicast bearer as the target number.

In this embodiment of this application, the source node determines, based on the numbering status of the service data of the target multicast service on the source multicast bearer, a number to be assigned to the next data packet that has not been assigned a number and that is to be sent through the dedicated bearer, and then indicates the number to the target node. For example, on the source node, the terminal receives the service data of the target multicast service TMGI1 through the MRB1, and the network side configures a dedicated bearer DRB1 for the terminal. The source node sends the service data of the target multicast service to the terminal through the source multicast bearer MRB1, but does not send the service data of the target multicast service to the terminal through the dedicated bearer DRB1. Therefore, the numbering status of the dedicated bearer DRB1 is an initial state, that is, a number has not been assigned. Assuming that data packets numbered 0, 1, 2, and 3 have been sent through the multicast bearer MRB1 and data packets numbered 4 and 5 have been assigned numbers but have not been sent through the source multicast bearer, a next number to be assigned to a data packet that is to be sent through the multicast bearer is 6. In forwarding manner 2, when the source node determines to send the service data of the target multicast service through the dedicated bearer, the next number to be assigned for the multicast bearer is used as the number of the next data packet that has not been assigned a number and that is to be sent through the dedicated bearer. That is, the next data packet that has not been assigned a number and that is to be sent through the dedicated bearer should be assigned a number 6. The terminal indicates, to the target node, the number 6 that is determined based on the numbering status of the source multicast bearer.

Further, the method further includes: the source node forwards the first data to the target node through the data forwarding tunnel of the dedicated bearer, where the first data includes service data of the target multicast service that is not sent by the source node through the source multicast bearer.

In some implementations, the first data further includes any one of the following:

(1) data that has been sent by the source node through the source multicast bearer but fails to be successfully received by the terminal; and (2) all data packets that have been sent by the source node through the source multicast bearer and that start from the 1st data packet not successfully received by the terminal.

In some implementations, the method further includes: learning, by the source node based on a reception status of the source multicast bearer reported by the terminal through the source node, that a data packet sent through the source multicast bearer fails to be successfully received by the terminal.

Further, before the learning, by the source node based on a reception status of the source multicast bearer reported by the terminal through the source node, that a data packet sent through the source multicast bearer fails to be successfully received by the terminal, the method further includes:

sending second indication information to the terminal, where the second indication information is used to indicate the terminal to report the reception status of the source multicast bearer.

In some implementations, the method further includes:

in a case that the source node forwards the first data to the target node through the data forwarding tunnel of the dedicated bearer, using an assigned number of the first data on the source multicast bearer; or in a case that the source node forwards the first data to the target node through the data forwarding tunnel of the dedicated bearer, ignoring an assigned number of the first data on the source multicast bearer.

It should be noted that the using an assigned number of the first data on the source multicast bearer in a case that the source node forwards the first data to the target node through the data forwarding tunnel of the dedicated bearer can be understood as: when the source node forwards data to the target node, the assigned number of the first data on the source multicast bearer needs to be additionally notified to the target node. The ignoring an assigned number of the first data on the source multicast bearer in a case that the source node forwards the first data to the target node through the data forwarding tunnel of the dedicated bearer can be understood as: when the source node forwards data to the target node, the assigned number of the first data on the source multicast bearer does not need to be notified to the target node. After the target node receives the data, if the data has no number, the target node assigns a new number to the data. If the data has a number, the data corresponding to the number is still sent to the terminal through the dedicated bearer by using the number.

It should also be noted that regardless of which data forwarding manner described above, the source node needs to forward data packets in order (for example, based on the numbers corresponding to the data packets and/or based on an order in which the data packets arrive at the source node) to the target node through the data forwarding tunnel of the dedicated bearer. When forwarding the data packets, the source node forwards as needed, based on the numbers of the data packets, data packets that have been assigned numbers, and then forwards, based on an order in which the data packets arrive at the source node, data that has not been assigned numbers. As an example, it is assumed that the source node has sent, through the source multicast bearer, data packets numbered 0, 1, 2, 3, 4, and 5, data packets numbered 6, 7, and 8 have not been sent through the source multicast bearer, and the data packets numbered 2 and 5 fail to be successfully received by the terminal. If determining to forward the data packets numbered 6, 7, and 8 to the target node, the source node needs to forward the data packets numbered 6, 7, and 8 to the target node in ascending order of numbers. In a case that numbers already assigned to the data on the source multicast bearer are ignored during the data forwarding process, the source node still needs to forward, to the target node as needed in ascending order of the numbers assigned to the data on the source multicast bearer, the data packets numbered 6, 7, and 8.

The following provides description with specific examples. For example, it is assumed that the source node has sent, through the source multicast bearer, data packets numbered 0, 1, 2, 3, 4, and 5, data packets numbered 6, 7, and 8 have not been sent through the source multicast bearer, and the data packets numbered 2 and 5 fail to be successfully received by the terminal. In this case, the data packets to be sent through the dedicated bearer include the data packets numbered 6, 7, and 8. This method is equivalent to that the source node forwards, to the target node through the data forwarding tunnel of the dedicated bearer, only the service data of the target multicast service that has not been sent through the source multicast bearer. For example, it is assumed that the source node has sent, through the source multicast bearer, data packets numbered 0, 1, 2, 3, 4, and 5, data packets numbered 6, 7, and 8 have not been sent through the source multicast bearer, and the data packets numbered 2 and 5 fail to be successfully received by the terminal.

In addition to the data packets numbered 6, 7, and 8, the data packets to be sent through the dedicated bearer may also include the data packets numbered 2 and 5. This manner is equivalent to that the service data of the target multicast service not successfully received by the terminal and the service data of the target multicast service that has not yet been sent through the source multicast bearer are all forwarded to the target node by the source node through the data forwarding tunnel of the dedicated bearer of the terminal. Certainly, the to-be-sent data packets sent through the dedicated bearer may also include the data packets numbered 2, 3, 4, and 5. This manner is equivalent to that all data packets sent through the source multicast bearer and starting from the 1st piece of service data of the target multicast service not successfully received by the terminal as well as the service data of the target multicast service that has not yet been sent through the source multicast bearer are all forwarded to the target node by the source node through the data forwarding tunnel of the dedicated bearer of the terminal.

In addition, when the source node forwards the first data to the target node through the data forwarding tunnel of the dedicated bearer, the assigned number of the first data on the source multicast bearer is ignored, and the to-be-forwarded service data of the target multicast service being used as new data of the dedicated bearer can be construed as data that is of the dedicated bearer of the terminal and that has not been assigned a number. Subsequently, the target node performs re-numbering or continues to perform numbering based on the numbering status of the dedicated bearer indicated by the source node (that is, based on the target number indicated by the source node, the target node assigns a number to the received data having no number). For example, the target multicast service to be forwarded corresponds to numbers 2, 5, 6, 7, and 8 on the source multicast bearer, and data has not been sent on the dedicated bearer of the terminal (for example, in this case, the source node indicates the target number of 0 to the target node). The to-be-forwarded service data of the target multicast service being used as new data of the dedicated bearer of the terminal means that these data packets need to be renumbered based on the numbering status of the dedicated bearer, that is, when the source node forwards the data to the target node, numbers assigned to the data packets on the source multicast bearer do not need to be provided, and the target node will assign numbers 0, 1, 2, 3, and 4 to the data packets in sequence on the dedicated bearer.

It should be noted that the foregoing manner may be applicable to a scenario where the mapping relationship between the dedicated bearer and the target multicast service is a one-to-one relationship. For example, the terminal is receiving service data of multiple multicast services from the source node, and the network side may reserve one terminal-dedicated bearer for a multicast bearer corresponding to data of each multicast service. Different terminal-dedicated bearers are used for transmitting service data of different multicast services. The foregoing manner may alternatively be applicable to a scenario where the mapping relationship between the dedicated bearer and the target multicast service is a one-to-many relationship. For example, the terminal is receiving service data of multiple multicast services from the source node, and the network side may reserve one terminal-dedicated bearer for the multiple multicast services.

In a case of using the assigned number of the first data on the source multicast bearer when the source node forwards the first data to the target node through the data forwarding tunnel of the dedicated bearer, the source node uses to-beforwarded service data of the target multicast data that has not yet been assigned a number as new data of the dedicated bearer, and forwards the new data to the target node through the data forwarding tunnel of the dedicated bearer. In addition, for to-be-forwarded service data of the target multicast data that has been assigned a number, the source node retains its assigned number on the source multicast bearer, and the data is forwarded to the target node through the data forwarding tunnel of the dedicated bearer. For example, it is assumed that the source node has sent, through the multicast bearer, data packets numbered 0, 1, 2, 3, 4, and 5, data packets numbered 6, 7, and 8 have not been sent through the source multicast bearer, and the data packets numbered 2 and 5 fail to be successfully received by the terminal. The source node may merely determine to send, to the target node through the data forwarding tunnel of the dedicated bearer, data that has not been sent through the source multicast bearer. In this case, it is equivalent to that the data packets numbered 6 and 7 and data packets that have not been assigned numbers on the multicast bearer are forwarded to the target node through the data forwarding tunnel of the dedicated bearer. Then, for the data packets that have been assigned numbers on the source multicast bearer, the source node retains its originally assigned numbers during forwarding, that is, the target node does not need to assign new numbers. The source node may alternatively send, to the target node through the data forwarding tunnel of the dedicated bearer, data packets that have been already sent through the source multicast bearer but fail to be successfully received by the terminal. It should be noted that during forwarding, the source node needs to retain originally assigned numbers of these data packets, that is, the target node does not need to assign new numbers.

Correspondingly, for the target node, the target node receives numbers indicated by the source node, and assigns the numbers to data packets that have not been assigned numbers and that are to be sent through the dedicated bearer. In addition, for the data packets that are forwarded by the source node and that have been assigned numbers, the target node retains the numbers, and sends the data to the terminal through the dedicated bearer.

In some implementations, the method further includes: sending, by the source node, first configuration information to the terminal, so that the terminal configures the dedicated bearer based on the first configuration information.

Further, the first configuration information carries a bearer identifier configured for the dedicated bearer, and carries no layer 2 configuration information of the dedicated bearer.

In this embodiment of this application, the above method is applicable to a scenario where the dedicated bearer has been pre-configured before the source node determines to perform handover. The dedicated bearer may be a virtual bearer, that is, the network side provides the terminal with a bearer identifier of the dedicated bearer but provides no layer 2 configuration information of the dedicated bearer. To be specific, the network side does not provide the terminal with layer 2 configuration information required for the bearer, such as PDCP configuration information, RLC configuration information, and logical channel configuration information. The bearer identifier of the dedicated bearer is associated with the layer 2 entity of the source multicast bearer, and the terminal may continue to receive the service data of the target multicast service from the target node through the layer 2 entity of the source multicast bearer. During the association process, the terminal does not need to process the layer 2 entity (that is, maintains a reception status of the current layer 2 entity (such as a PDCP entity)), so as to perform reordering and repeated detection on data received from the source node and data received by the target node.

Figure 3:
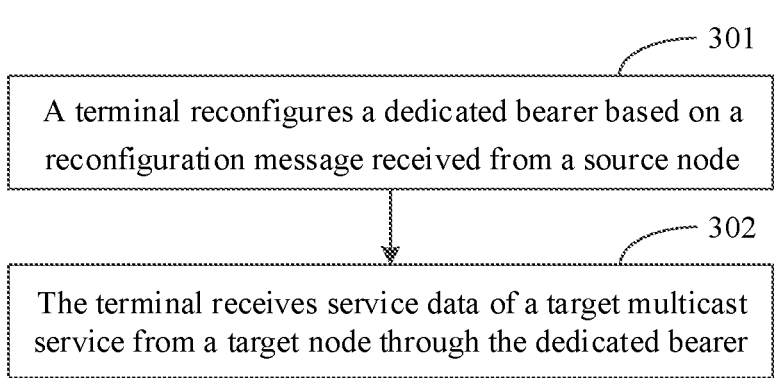
FIG. 3 is a second schematic flowchart of a service data processing method according to an embodiment of this application.

Referring to FIG. 3, an embodiment of this application provides a service data processing method, including the following steps.

Step 301: A terminal reconfigures a dedicated bearer based on a reconfiguration message received from a source node.

Step 302: The terminal receives service data of a target multicast service from a target node through the dedicated bearer.

In this embodiment of this application, the source node supports an MBS capability, and the terminal receives the target multicast service from the source node through a source multicast bearer.

In some implementations, the method further includes: the terminal configures a dedicated bearer before the source node determines to hand over the terminal to the target node; or, the terminal configures a dedicated bearer after the source node determines to hand over the terminal to the target node.

In some implementations, the terminal may reconfigure the dedicated bearer based on the reconfiguration message, that is, the terminal performs a reconfiguration operation on the dedicated bearer based on the reconfiguration message received from the source node in any one of the following manners:

Operation Manner 1:

The terminal associates a bearer identifier of the dedicated bearer with a layer 2 entity of the source multicast bearer.

In this embodiment of this application, the bearer identifier of the dedicated bearer is associated with the layer 2 entity of the source multicast bearer, and the layer 2 entity includes a packet data convergence protocol (PDCP) entity, a radio link control protocol (RLC) entity, and a multiple access channel (MAC) entity. This method is applicable to a scenario where the dedicated bearer has been pre-configured before the source node determines to perform handover, and is also applicable to a scenario where the source node temporarily configures a dedicated bearer for the terminal after determining to perform handover.

In some implementations, the method further includes: the terminal receives the first configuration information from the source node; and the terminal configures the dedicated bearer based on the first configuration information.

Further, the first configuration information carries a bearer identifier configured for the dedicated bearer, and carries no layer 2 configuration information of the dedicated bearer.

It should be noted that, for a scenario where the dedicated bearer has been pre-configured before the source node determines to perform handover, the dedicated bearer may be a virtual bearer, that is, the network side provides the terminal with a bearer identifier of the dedicated bearer but provides no layer 2 configuration information of the dedicated bearer. To be specific, the network side does not provide the terminal with layer 2 entity configuration information required for the bearer, such as PDCP configuration information, RLC configuration information, and logical channel configuration information. The bearer identifier of the dedicated bearer is associated with the layer 2 entity of the source multicast bearer, and the terminal may continue to receive the service data of the target multicast service from the target node through the layer 2 entity of the source multicast bearer. During the association process, the terminal does not need to process the layer 2 entity (that is, maintains a reception status of the current layer 2 entity (such as a PDCP entity)), so as to perform reordering and repeated detection on data received from the source node and data received by the target node.

Operation Manner 2:

The terminal learns a reception status of the dedicated bearer based on a reception status of the source multicast bearer.

Further, in a case that the terminal learns an MBS capability being not supported by the target node, the reception status of the dedicated bearer is learned based on the reception status of the source multicast bearer.

In some implementations, before the terminal learns the reception status of the dedicated bearer based on the reception status of the source multicast bearer, the method further includes: the terminal receives first indication information from the source node, where the first indication information is used to indicate that the dedicated bearer is used to carry the service data of the target multicast service.

With the first indication information received, the terminal may learn which dedicated bearer and which source multicast bearer are both used for receiving service data of the same target multicast service. After knowing the association relationship between the dedicated bearer and the source multicast bearer, the terminal may learn the reception status of the dedicated bearer based on the reception status of the source multicast bearer. It can be understood that the terminal may copy the reception status of the source multicast bearer to the dedicated bearer, and the dedicated bearer of the terminal may continue to receive the service data of the target multicast service sent by the target node. This method is applicable to a case where during the data forwarding process, the source node continues to use numbers of the data that are assigned on the source multicast bearer. Because the target node receiving a data packet with a corresponding number may continue to use the number to send the data to the terminal, if the terminal can copy the reception status of the source multicast bearer to the dedicated bearer, the terminal can detect which pieces of data have not been yet received and which ones have already been received. In addition, repeated detection and reordering operations can also be performed.

That the terminal learns the MBS capability being not supported by the target node includes at least one of the following:

(1) The terminal determines, based on PDCP status report indication information of the dedicated bearer, that the target node does not support the MBS capability.

For example, if the network side configures the terminal to report the reception status of the source multicast bearer, the terminal may determine that the target node is an enhanced node, that is, a node having the MBS capability. If the network side configures the terminal to report the reception status of the dedicated bearer, the terminal may determine that the target node is a legacy node. For example, the terminal has received no data through the dedicated bearer, and therefore, theoretically the network side does not configure the terminal to report the reception status of the dedicated bearer. However, if the network side configures the terminal to report the reception status of the dedicated bearer, and the dedicated bearer is associated with the source multicast bearer (that is, both being used to carry service data of the same target multicast service), the terminal can understand it as that the network side actually wants the terminal to report the reception status of the source multicast bearer. Further, the terminal may determine that the target node does not have the MBS capability.

(2) In a case that the reconfiguration message carries no multicast configuration information of the target multicast service, the terminal determines that the target node does not support the MBS capability.

For example, when a reconfiguration message carrying a handover command is received and the terminal detects that the configuration message carries no multicast configuration information of the target multicast service, the terminal determines that the target node is a legacy node. When the terminal detects that the configuration message carries the multicast configuration information of the target multicast service, the terminal determines that the target node is an enhanced node, that is, a base station supporting the MBS capability.

As an example of the terminal performing the above operation manner 2, the network side configures a dedicated bearer DRB1 for the terminal in advance. The dedicated bearer DRB1 is configured by the network side and reserved for the target multicast service TMGI1. On the source node, the terminal receives the service data of the target multicast service TMGI1 through a multicast bearer MRB1 configured by the network side. When the reconfiguration message carrying the handover command is received and the terminal detects that the configuration message carries no multicast configuration information of the target multicast service, the terminal determines that the target node is a legacy node. In this case, the terminal initializes the reception status of the dedicated node based on the reception status of the source multicast bearer, for example, copying the reception status of the source multicast bearer to the dedicated bearer. In addition, the terminal can also transfer data from a buffer of the source multicast bearer to a buffer of the dedicated bearer. This manner is applicable to a scenario where the source node always uses the foregoing forwarding manner 2 to forward data to the target node.

In some implementations, the foregoing operation manner 2 may alternatively be performed according to indication information. To be specific, that the terminal learns the reception status of the dedicated bearer based on the reception status of the source multicast bearer includes:

(1) In a case that the terminal receives third indication information from the source node, synchronizing the reception status of the dedicated bearer based on the reception status of the source multicast bearer, where the third indication information is used to indicate that the source node determines a target number based on a numbering status of the service data of the target multicast service on the source multicast bearer, the target number is used to indicate, to the target node, a number assigned to a target data packet, and the target data packet is a next not-yet-numbered data packet to be sent through the dedicated bearer. That is, the first indication information indicates the source node to forward the service data of the target multicast service to the target node through the data forwarding tunnel of the dedicated bearer in the forwarding manner 2.

In this embodiment of this application, because the target data packet is numbered based on a numbering status of the source multicast bearer, considering that the reception status of the dedicated bearer (such as a size of the data packet receive window and corresponding numbers of receivable data packets) may not match the numbering status of the source multicast bearer, the reception status of the dedicated bearer needs to be synchronized with the reception status of the source multicast bearer to ensure that data packets on the source multicast bearer can be received through the dedicated bearer.

(2) In a case that the terminal receives fourth indication information from the source node, maintaining a current reception status of the dedicated bearer, where the fourth indication information is used to indicate that the source node determines a target number based on a numbering status of the dedicated bearer, the target number is used to indicate, to the target node, a number assigned to a target data packet, and the target data packet is a next not-yet-numbered data packet to be sent through the dedicated bearer. That is, the second indication information indicates the source node to forward the service data of the target multicast service through the data forwarding tunnel of the dedicated bearer to the target node in the forwarding manner 1.

In this embodiment of this application, when the source node has not transmitted the service data of the target multicast service through the dedicated bearer, the reception status of the dedicated bearer is an initial state, that is, a related reception status variable is an initial value prescribed in the protocol. Because the target data packet is numbered based on the numbering status of the dedicated bearer, the terminal side merely needs to maintain the current reception status of the dedicated bearer, so as to ensure that data packets on the source multicast bearer can be received through the dedicated bearer.

It should be additionally noted that the third indication information and the fourth indication information may be a same indication parameter, for example, a 1-bit indication parameter; when the indication parameter takes a value of "1", it indicates the meaning of the third indication information; or when the indication parameter takes a value of "0", it indicates the meaning of the fourth indication information. Certainly, the third indication information and the fourth indication information may alternatively be different indication parameters, which is not specifically limited in this embodiment of this application.

For the foregoing operation manner 2, when the terminal receives the reconfiguration message carrying the handover command, if the reconfiguration message does not indicate the terminal to release the layer 2 entity (such as PDCP entity and RLC entity) of the source multicast bearer, the terminal initializes the reception status of the dedicated bearer based on the reception status of the source multicast bearer, and also transfers data buffered by the layer 2 entity of the source multicast bearer to a corresponding layer 2 entity of the dedicated bearer. For example, the terminal transfers data from a receive buffer of the PDCP entity of the source multicast bearer to a receive buffer of the PDCP entity of the dedicated bearer.

In addition, when the terminal receives status report indication information from the network (the status report indication information is used to indicate the terminal to report a reception status of data that is received by the terminal through the dedicated bearer), the terminal reports a reception status of the source multicast bearer through the dedicated bearer.

In some implementations, the method further includes: the terminal receives second indication information from the source node, where the second indication information is used to indicate the terminal to report a reception status of the source multicast bearer through the source node.

Further, the method further includes:
the terminal reports the reception status of the source multicast bearer through the source node.

It should be noted that, in the service data processing method provided by the embodiments of this application, the execution body may be a service data processing apparatus, or a control module for executing the service data processing method in the service data processing apparatus. In the embodiments of this application, the service data processing apparatus provided by the embodiments of this application is described by using the service data processing method being executed by the service data processing apparatus as an example.

Figure 4:
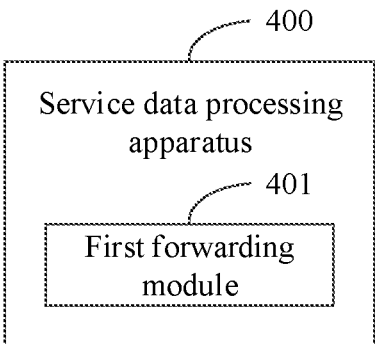
FIG. 4 is a first schematic structural diagram of a service data processing apparatus according to an embodiment of this application.

Referring to FIG. 4, an embodiment of this application provides a service data processing apparatus 400, including:
  a first forwarding module 401, configured to: forward, for a source node based on an MBS capability of a target node, service data of a target multicast service to the target node through a data forwarding tunnel of a dedicated bearer of a terminal; where
  the terminal receives the target multicast service from the source node through a source multicast bearer.

In some implementations, the apparatus further includes:
  a first obtaining module, configured to obtain, for the source node, the MBS capability of the target node based on one or more of the following information:
  multicast configuration information in a handover acknowledgment message; and
  capability exchange information between the source node and the target node.

In some implementations, the first obtaining module is further configured to:
  send, for the source node, a handover request message to the target node, where the handover request message carries multicast configuration information of the terminal being on the source node;
  receive, for the source node, a handover acknowledgment message from the target node; and
  perform, for the source node, at least one of the following:
  if the handover acknowledgment message carries no multicast configuration information of the terminal on the target node, determining that the target node does not support the MBS capability; and
  if the handover acknowledgment message carries multicast configuration information of the terminal on the target node, determining that the target node supports the MBS capability.

In some implementations, the first obtaining module is further configured to:
  send, for the source node, a capability request message to the target node;
  receive, for the source node, a capability request response message from the target node, where the capability request response message carries information about capabilities supported by the target node and/or information about capabilities not supported by the target node; and
  determine, based on the information about capabilities supported by the target node and/or the information about capabilities not supported by the target node, that the target node does not support the MBS capability or supports the MBS capability;
  or,
  send, for the source node, a capability indication message to the target node, where the capability indication message carries information about capabilities supported by the source node and/or information about capabilities not supported by the source node;
  receive, for the source node, a capability indication acknowledgment message from the target node, where the capability indication acknowledgment message carries information about capabilities supported by the target node and/or information about capabilities not supported by the target node; and determine, based on the information about capabilities supported by the target node and/or the information about capabilities not supported by the target node, that the target node does not support the MBS capability or supports the MBS capability.

In some implementations, the apparatus further includes: a first configuration module configured to:

configure, for the source node, the dedicated bearer before determining to hand over the terminal to the target node;

or, configure, for the source node, the dedicated bearer after determining to hand over the terminal to the target node.

In some implementations, the dedicated bearer is used to carry service data of the target multicast service.

In some implementations, the apparatus further includes: a first sending module, configured to, for the source node, send first indication information to the terminal, where the first indication information is used to indicate that the dedicated bearer is used to carry service data of the target multicast service.

In some implementations, the apparatus further includes: a first determining module configured to:

determine, for the source node, a target number based on a numbering status of the dedicated bearer, and indicate the target number to the target node;

or, determine, for the source node, a target number based on a numbering status of the service data of the target multicast service on the source multicast bearer, and indicate the target number to the target node; where the target number is used to indicate, to the target node, a number assigned to a target data packet, and the target data packet is a next not-yet-numbered data packet to be sent through the dedicated bearer.

In some implementations, the first determining module is further configured to:

determine, for the source node, a next to-be-assigned number of the dedicated bearer as the target number;

or, determine, for the source node, a next to-be-assigned number of the source multicast bearer as the target number.

In some implementations, the apparatus further includes: a second forwarding module configured to:

forward, for the source node, first data to the target node through the data forwarding tunnel of the dedicated bearer, where the first data includes service data of the target multicast service that is not sent by the source node through the source multicast bearer.

In some implementations, the first data further includes any one of the following:

data that has been sent by the source node through the source multicast bearer but fails to be successfully received by the terminal; and all data packets that have been sent by the source node through the source multicast bearer and that start from the 1st data packet not successfully received by the terminal.

In some implementations, the apparatus further includes: a first learning module configured to:

learn, for the source node based on a reception status of the source multicast bearer reported by the terminal through the source node, that a data packet sent through the source multicast bearer fails to be successfully received by the terminal.

In some implementations, the apparatus further includes: a second sending module configured to:

before the source node learns, based on a reception status of the source multicast bearer reported by the terminal through the source node, that a data packet sent through the source multicast bearer fails to be successfully received by the terminal, send second indication information to the terminal, where the second indication information is used to indicate the terminal to report the reception status of the source multicast bearer.

In some implementations, the apparatus further includes: a numbering module configured to:

in a case that the source node forwards the first data to the target node through the data forwarding tunnel of the dedicated bearer, use an assigned number of the first data on the source multicast bearer;

or, in a case that the source node forwards the first data to the target node through the data forwarding tunnel of the dedicated bearer, ignore an assigned number of the first data on the source multicast bearer.

In some implementations, the apparatus further includes: a third sending module, configured to, for the source node, send first configuration information to the terminal, so that the terminal configures the dedicated bearer based on the first configuration information.

In some implementations, the first configuration information carries a bearer identifier configured for the dedicated bearer, and carries no layer 2 configuration information of the dedicated bearer.

Figure 5:
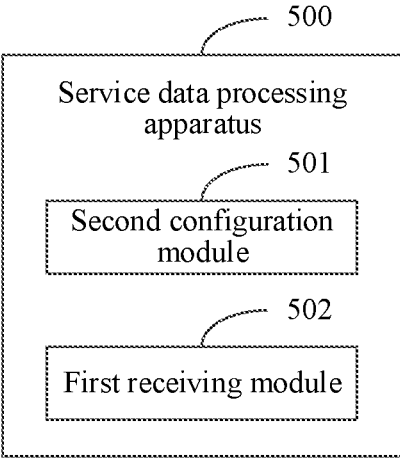
FIG. 5 is a second schematic structural diagram of a service data processing apparatus according to an embodiment of this application.

Referring to FIG. 5, an embodiment of this application provides a service data processing apparatus 500, including:

a second configuration module 501, configured to reconfigure a dedicated bearer based on a reconfiguration message received from a source node; and a first receiving module 502, configured to receive, for the terminal, service data of a target multicast service from a target node through the dedicated bearer; where the terminal receives the target multicast service from the source node through a source multicast bearer.

In some implementations, the apparatus further includes: a third configuration module configured to:

configure, for the terminal, the dedicated bearer before the source node determines to hand over the terminal to the target node; or configure, for the terminal, the dedicated bearer after the source node determines to hand over the terminal to the target node.

In some implementations, the second configuration module is further configured to:

associate, for the terminal, a bearer identifier of the dedicated bearer with a layer 2 entity of the source multicast bearer; or learn, for the terminal, a reception status of the dedicated bearer based on a reception status of the source multicast bearer.

In some implementations, the second configuration module is further configured to:

in a case that the terminal learns an MBS capability being not supported by the target node, learn, for the terminal, the reception status of the dedicated bearer based on the reception status of the source multicast bearer.

In some implementations, the apparatus further includes: a second receiving module configured to:

before the terminal learns the reception status of the dedicated bearer based on the reception status of the source multicast bearer, receive, for the terminal, first indication information from the source node, where the first indication information is used to indicate that the dedicated bearer is used to carry the service data of the target multicast service.

In some implementations, the second configuration module is further configured to perform at least one of the following:

determining, for the terminal based on packet data convergence protocol PDCP status report indication information of the dedicated bearer, that the target node does not support the MBS capability; and in a case that the reconfiguration message carries no multicast configuration information of the target multicast service, determining, for the terminal, that the target node does not support the MBS capability.

In some implementations, the second configuration module is further configured to:

in a case that the terminal receives third indication information from the source node, synchronize the reception status of the dedicated bearer based on the reception status of the source multicast bearer, where the third indication information is used to indicate that the source node determines a target number based on a numbering status of the service data of the target multicast service on the source multicast bearer, the target number is used to indicate, to the target node, a number assigned to a target data packet, and the target data packet is a next not-yet-numbered data packet to be sent through the dedicated bearer;

or, in a case that the terminal receives fourth indication information from the source node, maintain a current reception status of the dedicated bearer, where the fourth indication information is used to indicate that the source node determines a target number based on a numbering status of the dedicated bearer, the target number is used to indicate, to the target node, a number assigned to a target data packet, and the target data packet is a next not-yet-numbered data packet to be sent through the dedicated bearer.

In some implementations, the apparatus further includes:

a third receiving module configured to:

receive, for the terminal, second indication information from the source node, where the second indication information is used to indicate the terminal to report a reception status of the source multicast bearer through the source node.

In some implementations, the apparatus further includes:

a reporting module configured to:

report, for the terminal, the reception status of the source multicast bearer through the source node.

In some implementations, the apparatus further includes:

a fourth receiving module, configured to receive, for the terminal, first configuration information from the source node; and a fourth configuration module, configured to configure, for the terminal, the dedicated bearer based on the first configuration information.

In some implementations, the first configuration information carries a bearer identifier configured for the dedicated bearer, and carries no layer 2 configuration information of the dedicated bearer.

In this embodiment of this application, the source node sends, based on the MBS capability of the target node, the service data of the target multicast service to the terminal through the dedicated bearer, so as to resolve the problem of an excessively long interruption time for multicast service data caused by movement of a terminal from a node supporting MBS to a node not supporting MBS.

The service data processing apparatus in this embodiment of this application may be an apparatus, or an apparatus or electric device having an operating system, or may be a component, an integrated circuit, or a chip in the terminal. The apparatus or electric device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The service data processing apparatus provided in this embodiment of this application is capable of implementing the processes implemented in the method embodiments in FIG. 2 to FIG. 3, with the same technical effects achieved. To avoid repetition, details are not described herein again.

Figure 6:
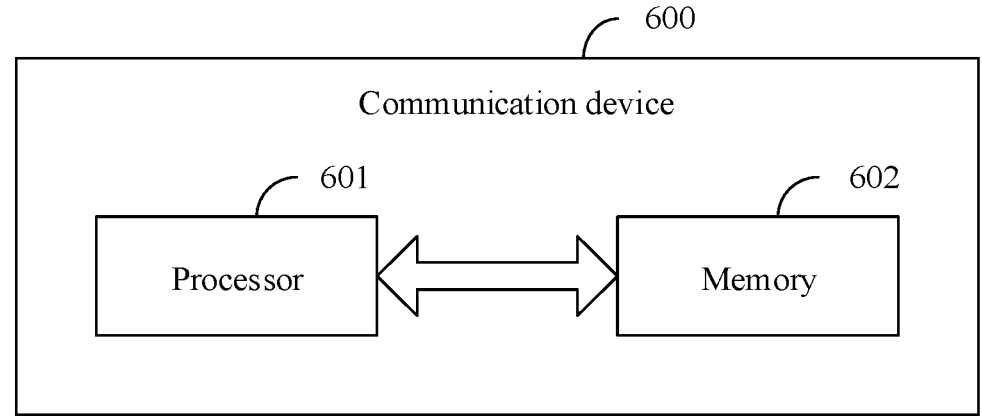
FIG. 6 is a schematic structural diagram of a communication device according to an embodiment of this application.

Optionally, as shown in FIG. 6, an embodiment of this application further provides a communication device 600, including a processor 601, a memory 602, and a program or instructions stored in the memory 602 and capable of running on the processor 601. For example, when the communication device 600 is a source node and when the program or the instructions are executed by the processor 601, the processes of the foregoing embodiment of the service data processing method shown in FIG. 2 are implemented, with the same technical effects achieved. When the communication device 600 is a terminal and when the program or the instructions are executed by the processor 601, the processes of the foregoing service data processing method embodiment shown in FIG. 3 are implemented, with the same technical effects achieved. To avoid repetition, details are not described herein.

An embodiment of this application further provides a source node, including a processor and a communication interface, where the communication interface is configured to forward, for the source node based on an MBS capability of a target node, service data of a target multicast service to the target node through a data forwarding tunnel of a dedicated bearer of a terminal; where the terminal receives the target multicast service from the source node through a source multicast bearer. The source node embodiments correspond to the foregoing method embodiments of the source node, and all the implementation processes and implementations of the foregoing method embodiments can be applied to the source node embodiments, with the same technical effects achieved.

Figure 7:
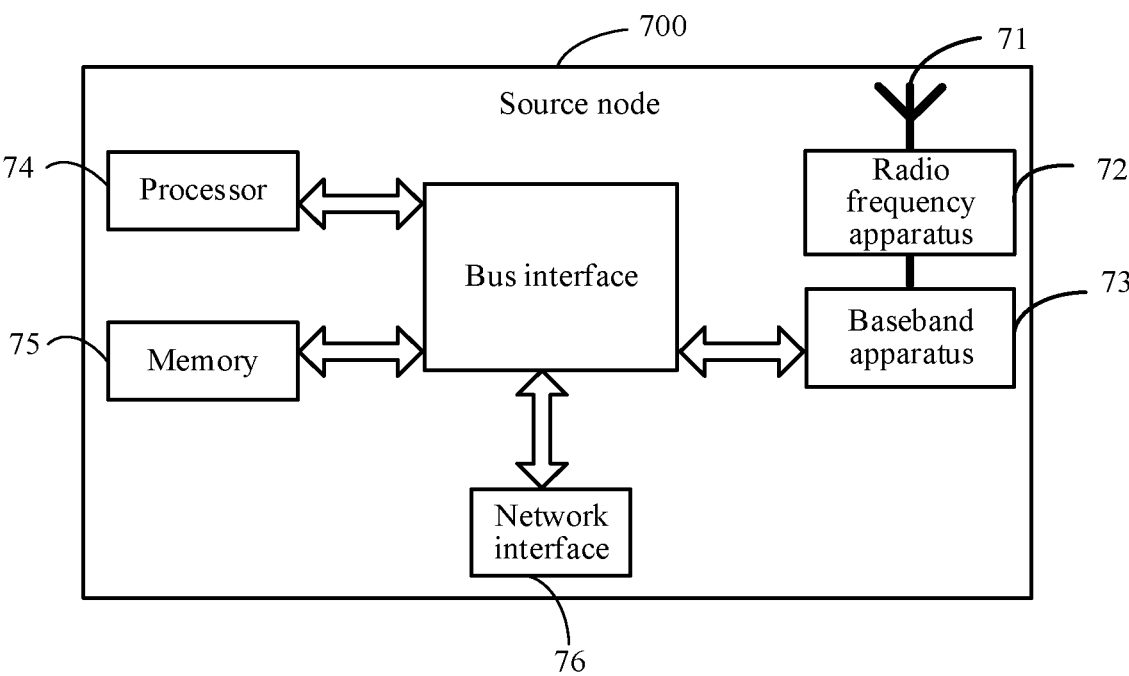
FIG. 7 is a schematic structural diagram of a source node according to an embodiment of this application.

Specifically, an embodiment of this application further provides a source node. As shown in FIG. 7, the source node 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes to-be-sent information, and sends the information to the radio frequency apparatus 72; and the radio frequency apparatus 72 processes the received information and then sends the information out by using the antenna 71.

The frequency band processing apparatus may be located in the baseband apparatus 73. The method performed by the source node in the foregoing embodiments may be implemented in the baseband apparatus 73, and the baseband apparatus 73 includes a processor 74 and a memory 75.

The baseband apparatus 73 may include, for example, at least one baseband board, where a plurality of chips are disposed on the baseband board. As shown in FIG. 7, one of the chips, for example, the processor 74, is connected to the memory 75, to invoke a program in the memory 75 to perform the operation of the network device shown in the foregoing method embodiments.

The baseband apparatus 73 may further include a network interface 76, configured to exchange information with the radio frequency apparatus 72, where the interface is, for example, a common public radio interface (CPRI).

Specifically, the source node in this embodiment of the present invention further includes: instructions or a program stored in the memory 75 and capable of running on the processor 74. The processor 74 invokes the instructions or program in the memory 75 to execute the method executed by the modules shown in FIG. 4, with the same technical effects achieved. To avoid repetition, details are not repeated herein.

Figure 8:
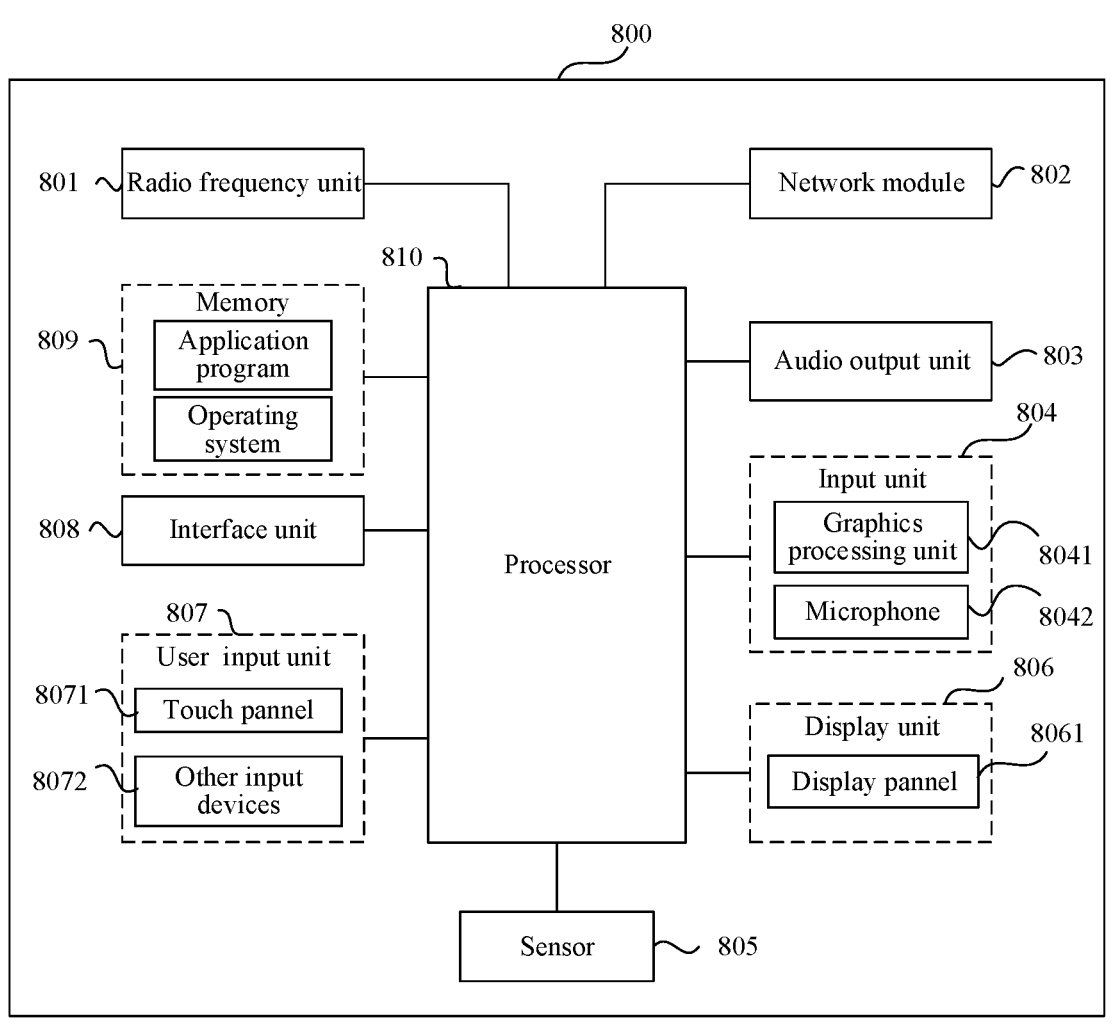
FIG. 8 is a schematic structural diagram of a terminal according to an embodiment of this application.

An embodiment of this application further provides a terminal, including a processor and a communication interface, where the processor is configured to reconfigure, for the terminal, a dedicated bearer based on a reconfiguration message received from a source node; and the communication interface is configured to receive, for the terminal, service data of a target multicast service from a target node through the dedicated bearer; where the terminal receives the target multicast service from the source node through a source multicast bearer. The terminal embodiments correspond to the foregoing terminal-side method embodiments, and the implementation processes and implementations of the foregoing method embodiments can be applied to the terminal embodiments, with the same technical effects achieved. Specifically, FIG. 8 is a schematic diagram of a hardware structure of a terminal for implementing the embodiments of this application.

The terminal 800 includes but is not limited to at least part of components such as a radio frequency unit 801, a network module 802, an audio output unit 803, an input unit 804, a sensor 805, a display unit 806, a user input unit 807, an interface unit 808, a memory 809, and a processor 810.

Persons skilled in the art can understand that the terminal 800 may further include a power supply (for example, a battery) supplying power to the components, and the power supply may be logically connected to the processor 810 through a power management system. In this way, functions such as charge management, discharge management, and power consumption management are implemented by using the power management system. The structure of the terminal shown in FIG. 8 does not constitute any limitation on the terminal. The terminal may include more or fewer components than shown in the figure, or a combination of some components, or the components disposed differently. Details are not described herein again.

It can be understood that in this embodiment of this application, the input unit 804 may include a graphics processing unit (GPU) 8041 and a microphone 8042. The graphics processing unit 8041 processes image data of a still picture or video obtained by an image capture apparatus (such as a camera) in a video capture mode or an image capture mode. The display unit 806 may include a display panel 8061, and the display panel 8061 may be configured in a form of a liquid crystal display, an organic light-emitting diode, and the like. The user input unit 807 may include a touch panel 8071 and other input devices 8072. The touch panel 8071 is also referred to as a touchscreen. The touch panel 8071 may include two parts: a touch detection apparatus and a touch controller. The other input devices 8072 may include but are not limited to a physical keyboard, a function key (such as a volume control key or a power on/off key), a trackball, a mouse, a joystick, and the like. Details are not described herein.

In this embodiment of this application, the radio frequency unit 801 receives downlink data from a network-side device, and then sends the downlink data to the processor 810 for processing; and also sends uplink data to the network-side device. Generally, the radio frequency unit 801 includes but is not limited to an antenna, at least one amplifier, a transceiver, a coupler, a low noise amplifier, a duplexer, and the like.

The memory 809 may be configured to store software programs or instructions and various data. The memory 809 may include a program or instruction storage area and a data storage area. The program or instruction storage area may store an operating system, an application program or instruction required by at least one function (for example, a sound playback function or an image playback function), and the like. In addition, the memory 809 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or other non-volatile solid-state storage devices.

The processor 810 may include one or more processing units. Optionally, an application processor and a modem processor may be integrated in the processor 810. The application processor primarily processes an operating system, user interfaces, application programs or instructions, and the like. The modem processor primarily processes radio communication, for example, being a baseband processor. It can be understood that the modem processor may alternatively be not integrated in the processor 810.

The processor 810 is configured to reconfigure a dedicated bearer based on a reconfiguration message received from a source node.

The radio frequency unit 801 is configured to receive, for the terminal, service data of a target multicast service from a target node through the dedicated bearer.

The terminal receives the target multicast service from the source node through a source multicast bearer.

Optionally, the processor 810 is further configured to:
configure, for the terminal, the dedicated bearer before the source node determines to hand over the terminal to the target node;
or,
configure, for the terminal, the dedicated bearer after the source node determines to hand over the terminal to the target node.

Optionally, the processor 810 is further configured to:
associate, for the terminal, a bearer identifier of the dedicated bearer with a layer 2 entity of the source multicast bearer;
or,
learn, for the terminal, a reception status of the dedicated bearer based on a reception status of the source multicast bearer.

Optionally, the processor 810 is further configured to:

in a case that the terminal learns an MBS capability being not supported by the target node, learn, for the terminal, the reception status of the dedicated bearer based on the reception status of the source multicast bearer.

Optionally, the radio frequency unit 801 is configured to:

before the terminal learns the reception status of the dedicated bearer based on the reception status of the source multicast bearer, receive, for the terminal, first indication information from the source node, where the first indication information is used to indicate that the dedicated bearer is used to carry the service data of the target multicast service.

Optionally, the processor 810 is further configured to perform at least one of the following:

determining, for the terminal based on packet data convergence protocol PDCP status report indication information of the dedicated bearer, that the target node does not support the MBS capability; and in a case that the reconfiguration message carries no multicast configuration information of the target multicast service, determining, for the terminal, that the target node does not support the MBS capability.

Optionally, the processor 810 is further configured to:

in a case that the terminal receives third indication information from the source node, synchronize the reception status of the dedicated bearer based on the reception status of the source multicast bearer, where the third indication information is used to indicate that the source node determines a target number based on a numbering status of the service data of the target multicast service on the source multicast bearer, the target number is used to indicate, to the target node, a number assigned to a target data packet, and the target data packet is a next not-yet-numbered data packet to be sent through the dedicated bearer;

or, in a case that the terminal receives fourth indication information from the source node, maintain a current reception status of the dedicated bearer, where the fourth indication information is used to indicate that the source node determines a target number based on a numbering status of the dedicated bearer, the target number is used to indicate, to the target node, a number assigned to a target data packet, and the target data packet is a next not-yet-numbered data packet to be sent through the dedicated bearer.

Optionally, the radio frequency unit 801 is configured to:

receive, for the terminal, second indication information from the source node, where the second indication information is used to indicate the terminal to report a reception status of the source multicast bearer through the source node.

Optionally, the radio frequency unit 801 is configured to:

report, for the terminal, the reception status of the source multicast bearer through the source node.

Optionally, the radio frequency unit 801 is configured to:

receive, for the terminal, first configuration information from the source node.

The processor 810 is configured to: configure, for the terminal, the dedicated bearer based on the first configuration information.

Optionally, the first configuration information carries a bearer identifier configured for the dedicated bearer, and carries no layer 2 configuration information of the dedicated bearer.

An embodiment of this application further provides a readable storage medium, where a program or instructions are stored in the readable storage medium. When the program or instructions are executed by a processor, the processes of the foregoing embodiment of the service data processing method can be implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or instructions of a network device to implement the processes of the foregoing embodiments of the service data processing method, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application provides a computer program product, where the computer program product is stored in a non-volatile storage medium, and when being executed by at least one processor, the computer program product is configured to implement the processes of the foregoing service data processing method embodiments, with the same technical effects achieved. To avoid repetition, details are not repeated herein.

An embodiment of this application further provides a communication device, configured to perform the processes of the foregoing service data processing method embodiments, with the same technical effects achieved. To avoid repetition, details are not described herein.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A service data processing method, comprising:
forwarding, by a source node based on a multicast broadcast service (MBS) capability of a target node, service data of a target multicast service to the target node through a data forwarding tunnel of a dedicated bearer of a terminal; wherein
the terminal receives the target multicast service from the source node through a source multicast bearer;
before the forwarding, by a source node based on an MBS capability of a target node, service data of a target multicast service to the target node through a data forwarding tunnel of a dedicated bearer of a terminal, the method further comprises:
obtaining, by the source node, the MBS capability of the target node based on multicast configuration information in a handover acknowledgment message;
wherein the obtaining, by the source node, the MBS capability of the target node based on the multicast configuration information in the handover acknowledgment message comprises:
sending, by the source node, a handover request message to the target node, wherein the handover request message carries multicast configuration information of the terminal being on the source node;
receiving, by the source node, a handover acknowledgment message from the target node; and
performing, by the source node, at least one of the following:
if the handover acknowledgment message carries no multicast configuration information of the terminal on the target node, determining that the target node does not support the MBS capability; and
if the handover acknowledgment message carries multicast configuration information of the terminal on the target node, determining that the target node supports the MBS capability.

2. The method according to claim 1, wherein before the forwarding, by a source node based on an MBS capability of a target node, service data of a target multicast service to the target node through a data forwarding tunnel of a dedicated bearer of a terminal, the method further comprises:
obtaining, by the source node, the MBS capability of the target node based on capability exchange information between the source node and the target node.

3. The method according to claim 2,
wherein the obtaining, by the source node, the MBS capability of the target node based on the capability exchange information between the source node and the target node comprises:
sending, by the source node, a capability request message to the target node;
receiving, by the source node, a capability request response message from the target node, wherein the capability request response message carries information about capabilities supported by the target node and/or information about capabilities not supported by the target node; and
based on the information about capabilities supported by the target node and/or the information about capabilities not supported by the target node, determining that the target node does not support the MBS capability or supports the MBS capability;
or,
sending, by the source node, a capability indication message to the target node, wherein the capability indication message carries information about capabilities supported by the source node and/or information about capabilities not supported by the source node;
receiving, by the source node, a capability indication acknowledgment message from the target node, wherein the capability indication acknowledgment message carries information about capabilities supported by the target node and/or information about capabilities not supported by the target node; and
based on the information about capabilities supported by the target node and/or the information about capabilities not supported by the target node, determining that the target node does not support the MBS capability or supports the MBS capability.

4. The method according to claim 1, wherein the method further comprises:
configuring, by the source node, the dedicated bearer before determining to hand over the terminal to the target node;
or,
configuring, by the source node, the dedicated bearer after determining to hand over the terminal to the target node.

5. The method according to claim 1, wherein the dedicated bearer is used to carry service data of the target multicast service,
wherein the method further comprises:
sending, by the source node, first indication information to the terminal, wherein the first indication information is used to indicate that the dedicated bearer is used to carry service data of the target multicast service.

6. The method according to claim 1, wherein the method further comprises:
determining, by the source node, a target number based on a numbering status of the dedicated bearer, and indicating the target number to the target node;
or,
determining, by the source node, a target number based on a numbering status of the service data of the target multicast service on the source multicast bearer, and indicating the target number to the target node; wherein
the target number is used to indicate, to the target node, a number assigned to a target data packet, and the target data packet is a next not-yet-numbered data packet to be sent through the dedicated bearer.

7. The method according to claim 6, wherein the determining, by the source node, a target number based on a numbering status of the dedicated bearer comprises: determining, by the source node, a next to-be-assigned number of the dedicated bearer as the target number;

or, the determining, by the source node, a target number based on a numbering status of the service data of the target multicast service on the source multicast bearer comprises:

determining, by the source node, a next to-be-assigned number of the source multicast bearer as the target number.

8. The method according to claim 1, wherein the method further comprises:

forwarding, by the source node, first data to the target node through the data forwarding tunnel of the dedicated bearer, wherein the first data comprises service data of the target multicast service that is not sent by the source node through the source multicast bearer, wherein the first data further comprises any one of the following:

data that has been sent by the source node through the source multicast bearer but fails to be successfully received by the terminal; and all data packets that have been sent by the source node through the source multicast bearer and that start from the 1st data packet not successfully received by the terminal.

9. The method according to claim 8, wherein the method further comprises:

learning, by the source node based on a reception status of the source multicast bearer reported by the terminal through the source node, that a data packet sent through the source multicast bearer fails to be successfully received by the terminal, wherein before the learning, by the source node based on a reception status of the source multicast bearer reported by the terminal through the source node, that a data packet sent through the source multicast bearer fails to be successfully received by the terminal, the method further comprises:

sending second indication information to the terminal, wherein the second indication information is used to indicate the terminal to report the reception status of the source multicast bearer.

10. The method according to claim 8, wherein the method further comprises:

in a case that the source node forwards the first data to the target node through the data forwarding tunnel of the dedicated bearer, using an assigned number of the first data on the source multicast bearer;

or, in a case that the source node forwards the first data to the target node through the data forwarding tunnel of the dedicated bearer, ignoring an assigned number of the first data on the source multicast bearer.

11. The method according to claim 1, wherein the method further comprises:

sending, by the source node, first configuration information to the terminal, so that the terminal configures the dedicated bearer based on the first configuration information, wherein the first configuration information carries a bearer identifier configured for the dedicated bearer, and carries no layer 2 configuration information of the dedicated bearer.

12. A service data processing method, comprising:

reconfiguring, by a terminal, a dedicated bearer based on a reconfiguration message received from a source node; and receiving, by the terminal, service data of a target multicast service from a target node through the dedicated bearer; wherein the terminal receives the target multicast service from the source node through a source multicast bearer;

the method further comprises:

obtaining, by the source node, an MBS capability of the target node based on multicast configuration information in a handover acknowledgment message;

wherein the obtaining, by the source node, the MBS capability of the target node based on the multicast configuration information in the handover acknowledgment message comprises:

sending, by the source node, a handover request message to the target node, wherein the handover request message carries multicast configuration information of the terminal being on the source node;

receiving, by the source node, a handover acknowledgment message from the target node; and performing, by the source node, at least one of the following:

if the handover acknowledgment message carries no multicast configuration information of the terminal on the target node, determining that the target node does not support the MBS capability; and if the handover acknowledgment message carries multicast configuration information of the terminal on the target node, determining that the target node supports the MBS capability.

13. The method according to claim 12, wherein the method further comprises:

configuring, by the terminal, the dedicated bearer before the source node determines to hand over the terminal to the target node;

or, configuring, by the terminal, the dedicated bearer after the source node determines to hand over the terminal to the target node.

14. The method according to claim 12, wherein the reconfiguring, by a terminal, a dedicated bearer based on a reconfiguration message received from a source node comprises:

associating, by the terminal, a bearer identifier of the dedicated bearer with a layer 2 entity of the source multicast bearer;

or, learning, by the terminal, a reception status of the dedicated bearer based on a reception status of the source multicast bearer.

15. The method according to claim 14, wherein the learning, by the terminal, a reception status of the dedicated bearer based on a reception status of the source multicast bearer comprises:

in a case that the terminal learns an MBS capability being not supported by the target node, learning, by the terminal, the reception status of the dedicated bearer based on the reception status of the source multicast bearer.

16. The method according to claim 15, wherein before the learning, by the terminal, a reception status of the dedicated bearer based on a reception status of the source multicast bearer, the method further comprises:

receiving, by the terminal, first indication information from the source node, wherein the first indication information is used to indicate that the dedicated bearer is used to carry the service data of the target multicast service.

17. The method according to claim 15, wherein that the terminal learns the MBS capability being not supported by the target node comprises at least one of the following:

determining, by the terminal based on packet data convergence protocol (PDCP) status report indication information of the dedicated bearer, that the target node does not support the MBS capability; and in a case that the reconfiguration message carries no multicast configuration information of the target multicast service, determining, by the terminal, that the target node does not support the MBS capability.

18. The method according to claim 14, wherein the learning, by the terminal, a reception status of the dedicated bearer based on a reception status of the source multicast bearer comprises:

in a case that the terminal receives third indication information from the source node, synchronizing the reception status of the dedicated bearer based on the reception status of the source multicast bearer, wherein the third indication information is used to indicate that the source node determines a target number based on a numbering status of the service data of the target multicast service on the source multicast bearer, the target number is used to indicate, to the target node, a number assigned to a target data packet, and the target data packet is a next not-yet-numbered data packet to be sent through the dedicated bearer;

or, in a case that the terminal receives fourth indication information from the source node, maintaining a current reception status of the dedicated bearer, wherein the fourth indication information is used to indicate that the source node determines a target number based on a numbering status of the dedicated bearer, the target number is used to indicate, to the target node, a number assigned to a target data packet, and the target data packet is a next not-yet-numbered data packet to be sent through the dedicated bearer.

19. The method according to claim 12, wherein the method further comprises:

receiving, by the terminal, second indication information from the source node, wherein the second indication information is used to indicate the terminal to report a reception status of the source multicast bearer through the source node, wherein the method further comprises:

reporting, by the terminal, the reception status of the source multicast bearer through the source node.

20. The method according to claim 12, wherein the method further comprises:

receiving, by the terminal, first configuration information from the source node; and configuring, by the terminal, the dedicated bearer based on the first configuration information, wherein the first configuration information carries a bearer identifier configured for the dedicated bearer, and carries no layer 2 configuration information of the dedicated bearer.

* * * * *